Oct. 9, 1962 R. A. MORCK 3,057,730
PRODUCTION OF BAKED GOODS WITHOUT PHYSICAL
WORKING OF THE INGREDIENTS
Filed Oct. 3, 1958
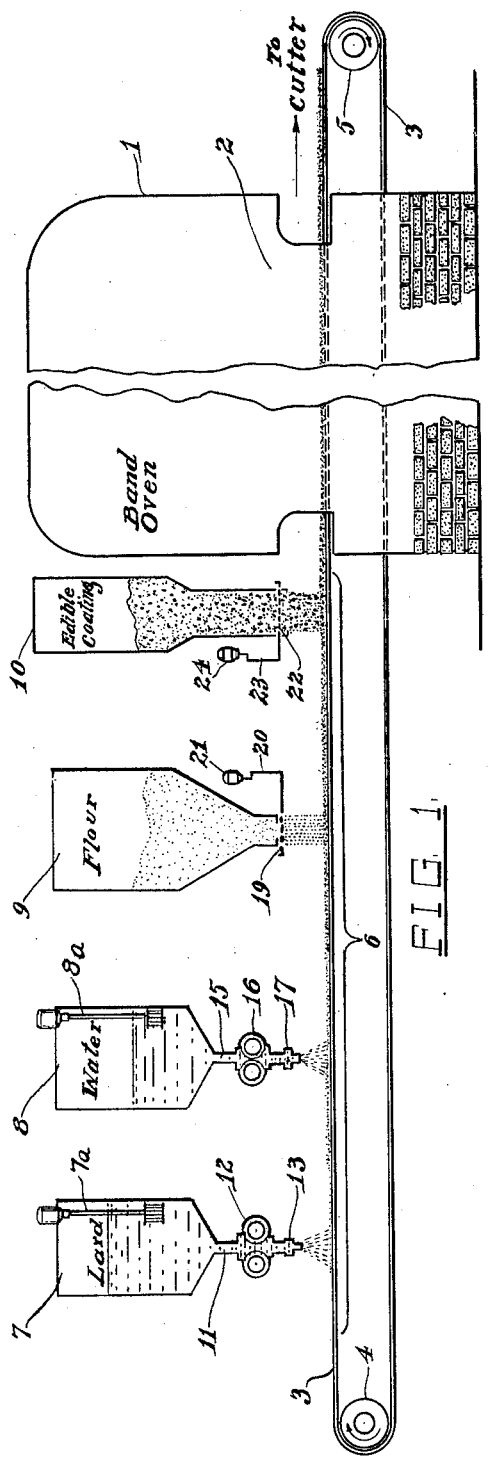
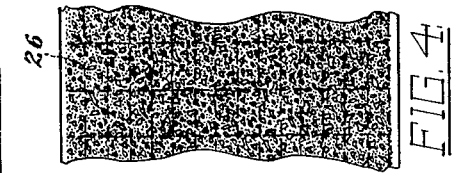
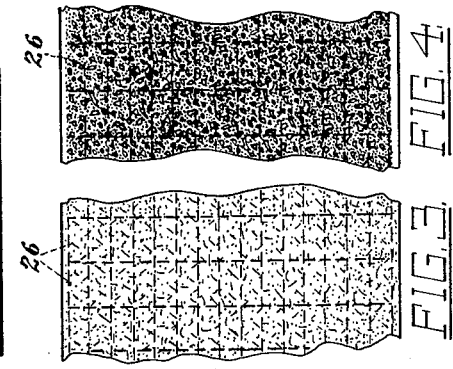
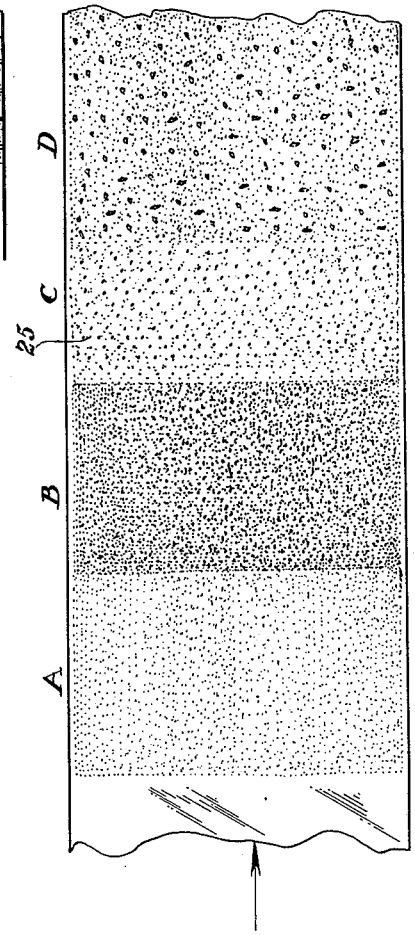
INVENTOR.
Roland A. Morck
BY James P. Curtis
Attorney United States Patent Office 3,057,730
Patented Oct. 9, 1962

3,057,730
PRODUCTION OF BAKED GOODS WITHOUT PHYSICAL WORKING OF THE INGREDIENTS
Roland A. Morck, Glen Rock, N.J., assignor to National Biscuit Company, New York, N.Y., a corporation of New Jersey
Filed Oct. 3, 1958, Ser. No. 765,217
9 Claims. (Cl. 99—86)

This invention relates generally to the art of making edible baked goods, especially biscuits, cookies, crackers, cakes and related goods such as are usually produced in commercial bakeries. However, it is broadly applicable to the production of any baked goods made primarily of flour and liquid or moisture, whether leavened or unleavened, and including cereals, pastries, dog biscuit and the like and other alimentary products for human and animal consumption.

From the earliest recording of the combining of flour or meal and water to prepare a dough for baking, it has always been thought that the two (and any additional ingredients to be included in the dough) had to be thoroughly stirred or otherwise mixed to blend them and develop the gluten of the flour and distribute it in an elastic network formation to produce a pasty mass of proper consistency for handling and to obtain the desired texture in the baked product. This belief has given rise to many limitations in the production of baked goods, both as regards the equipment for making and handling the dough and in the dough and the baked products themselves.

For example, in the commercial production of baked goods such as those referred to, the mixing equipment is required to handle several hundreds of pounds of materials at one time. It requires a large floor space, is costly to operate both from a motive-power and a man-power standpoint, and requires constant and careful cleaning. Its initial cost is high, and so is its maintenance and replacement cost. Moreover, in the production of dough or batter for a given product, the dough must have uniform characteristics, which means that every batch of dough or batter must be substantially the same each day and from day to day. Thus, the "batch" method of mixing requires that great care be exercised in developing and following a formula or recipe and controlling the speed and timing of mixing at different stages of the mixing operation. Also, the effects of variations in atmospheric conditions such as temperature and humidity have to be taken into account. A "slip-up" somewhere along the line can render the entire batch unsuitable and be very costly.

In recent years there have been attempts to mix doughs and batters by what is known as "continuous" mixing. Various methods and forms of equipment have been employed but none is known which approaches universality for different doughs and batters. In this connection, suffice it to say that the primary object of continuous mixing is to avoid some of the disadvantages of batch mixing by supplying a continuous flow of proportioned ingredients to the mixing equipment so that at any given time there is just enough dough or batter being prepared to supply the oven. The "continuous" method, however, does not eliminate expensive mixing equipment and other equipment to be referred to presently. As already stated, it has limitations in that it is not adapted for mixing all doughs and batters and there are some "hard to mix" doughs including, by way of illustration, heavy doughs which create so much heat that the continuous mixing equipment must be refrigerated. It is believed that it can be said fairly that "continuous" mixing is burdened with so many problems and limitations that the challenge which it presents is most discouraging and up to now, at least, it is far from being an improved mixing substitute for batch mixing, which is all that it would be.

In addition to the mixing, since a batch of dough, or a continuously mixed dough, is not in condition to be transferred directly from the mixer to the oven, it must first go from the mixer to a dough brake, wherein it is worked or kneaded and then calendered between a series of rollers into sheet form. This sheet then passes through cutting equipment where it is cut or stamped into the shape or outline of the final product desired and only now is it ready to be baked. Thus, according to established commercial baking practices followed up to the present time, the requirements for dough preparation equipment have included large, heavy, and expensive mixing machines, together with large, heavy and expensive dough working and cutting machines, both attended by many skilled operators and maintenance men, and a very large floor space.

Turning now to the limitations of the dough or batter and the baked product, a chief obstacle in the path of producing a product with the desired texture is control of the development of the gluten (protein) of the flour. Wheat, and rye to a lesser degree, are the only known sources of gluten, and the development of gluten flows directly from hydration of the flour, the extent to which it is developed into a strong network surrounding the starch and other particles in the flour depending upon the amount of protein in the particular flour used, the amount of moisture present and the degree of mixing to which the dough is subjected. In either leavened or unleavened dough the inevitable development of the gluten has been considered necessary and sought after to provide an elasticity in the dough mass to adapt it for handling by the dough brake and cutting mechanisms. When the dough is leavened, the gluten network performs the function of controlling the expansion of the gases given off by the leavening agent and, hence, the texture and quality of the baked product. Thus the gluten, so necessary from the standpoint of making and handling dough, presents a major problem in obtaining texture and quality characteristics in different varieties of baked products. While, generally speaking, good results have been obtained, they have been obtained only at the expense of costly research and the sacrifice of one characteristic for another. This has been due primarily to the fact that research has been based on the acceptance of the thought that mixing was necessary and has proceeded with that as a starting point. What research has been done toward minimizing gluten formation (still believing that mixing was necessary) has been mainly along the line of lessening the gluten content of the flour. By way of illustration, attempts to produce a good handling dough and at the same time control texture of the finished baked product have been made by using a mixture of starch (little or no gluten present) and flour, or flour with the gluten content partially destroyed, as by subjecting the flour to heat before it is used to make dough. Such practices, however, have seldom if ever given results good enough to become commercially acceptable.

The foregoing are only a few of the baker's problems which have existed from the outset in the art of baking. And it is to be noted particularly that they all have existed because of the basic concept that mixing of the ingredients was absolutely essential. So far as is known, the theory of mixing has not been seriously, if at all, questioned heretofore, and research to improve products and methods has proceeded on the basis of the necessity for mixing being an accepted fact.

The present invention ignores past practices and completely refutes the long established belief that ingredients must be mixed, as by stirring or other agitation, in their preparation to make an edible baked product. It is, therefore, a revolutionary concept in an art that is centuries old. Because of this, and for the sake of clarity, in describing the invention the word "dough" which is defined in Webster's New International Dictionary, Second Edition, unabridged, as "A soft mass of moistened flour or meal, thick enough to knead or roll; paste of bread"; or the word "batter" which in the same Dictionary is defined as "A mixture, as for cake or biscuit, consisting of flour, liquid, and other ingredients, and thin enough to pour or drop from a spoon." will not be used. Rather the words mass, accumulation, or accumulated mass will be used to designate the mass of ingredients prepared and ready for baking according to the present invention.

It is also pointed out that "biscuit" is used herein and in the appended claims in its generic meaning of leavened or unleavened plain, sweet or fancy cakes, breads, cookies, crackers, etc. without specific limitations to any national or regional connotation which the word may have acquired. Also, it is to be understood that the words "baking" and "baked" include "drying" and "dried," which latter words are sometimes used technically to distinguish from a true baking operation and baked product.

In its broad aspects, the present invention contemplates a formulated flour-base composition adapted for baking to form an edible food product, which comprises the mere accumulation of dry and moist or liquid ingredients in prescribed proportions on a supporting surface. More specifically, the invention contemplates a mass of ingredients, comprising dry ingredients such as flour, sugar, and leavening, and moist ingredients such as water, mixed with water solubles such as sugar, salt and leavening, and shortening, mixed with fat solubles such as flavorings, made ready for baking to produce an edible food product by being layered in mere accumulation in prescribed quantities on a supporting baking surface.

The invention also embraces the novel method of preparing the mass by merely building up (as by successive layering) an accumulation of raw materials by deposit in finely dispersed condition on a supporting surface and relying upon the accumulation to compose itself, and then subjecting the mass to a baking operation to produce a new and improved product having many characteristics which can not be obtained by the use of mixed doughs and batters.

In carrying out the invention, and by way of example only, a plurality of batteries of means for spraying shortening, means for spraying water, and means for sifting flour are arranged in series above a movable baking support such as the apron of a continuous band movable through an oven, commonly known as a "band oven." As the apron of the band moves toward the oven it receives successively from each of said batteries a sprayed film of shortening, a sprayed film of water, and a dusting of sifted flour until several layers of moist films and flour dustings have been built up one upon the other to form a mass of the desired thickness. The mass thus formed on the band apron by the mere accumulation of successive deposits of shortening, water and flour is ready to be carried by the band through the oven for baking. There is no mixing or agitation of the layered ingredients. The ingredients are simply allowed to compose themselves into a cohesive mass by contact, the proportions of moist (water and shortening) to one another and to the dry ingredients being predetermined so as to produce a mass of the desired composition, examples of which will be set forth in the detailed description to follow. For the sake of clarity, it is pointed out that "moist" is used in the broad sense of negating dryness, and the intent is that it shall include substances, such as plastic shortening, which are fluid but not moist in the technical sense that they do not wet.

During the baking operation, there may be some leavening of the mass due simply to the formation of gluten and the passing off of steam. The gluten development and distribution, however, is more "localized" and delicate, a lacing, as contrasted with the high gluten development and its distribution into the strong elastic network which is produced by mixing the ingredients. Furthermore, the degree of gluten development in the mass is determined in part by the proportion of water to shortening and the fineness or coarseness of the shortening droplets, and control of these relationships is employed to determine the structure, tenderness, and other characteristics of the baked product. When a leavening agent is added to the mass the lacing of gluten enables the baking of a product in which leavening is induced even in the absence of mixing, and variations in the degree of leavening can be accurately controlled by the relative proportions, and mode of application, of the moist ingredients used to control the gluten development. The localized lacing of gluten, however, enables the production of a product of much better controlled structural texture than does mixing of a dough.

The blended and sifted dry ingredients and the sprayed moist ingredients are layered in controlled proportions according to the type of baked product desired, i.e., the proportion of dry ingredients to one another, the proportion of water and water soluble ingredients to one another, the proportion of shortening and fat solubles to one another, and the proportions of the dry, water and shortening ingredients to one another will vary according to the desired characteristics of the baked product. Also, the layering does not have to follow a particular sequence and in one or more of the series of layerings the water film or the shortening film or the dusting can be omitted; or the proportions of the films in any one or more of the series of layerings may differ from that of other layerings. But in any case, as the materials are being layered the mere contact of the dry and moist ingredients results in the formation of a cohesive mass so that it may be said that the accumulation composes itself into the mass.

From the foregoing brief description, it will be seen that the present invention is a radical departure from accepted baking practices; and it is a departure which at one and the same time obviates the objectionable, expensive and limiting features of the prior practices, simplifies baking techniques, gives a wider range of procedural controls to baking, and produces baked products with desirable characteristics of texture, quality and variety not heretofore attainable.

In the accompanying drawings, a preferred embodiment of means for carrying out the invention has been shown diagrammatically and merely by way of example, and obviously many variations and modifications of said means and the invention carried out thereby may be made which will still be comprised within the spirit of the invention. It is to be understood, therefore, that the invention is not limited to any specific form or embodiment of the means for or the method of carrying it out, except insofar as such limitations are specified in the appended claims.

Referring to the drawings:

FIG. 1 is a diagrammatic view in elevation of means for carrying out the invention;

FIG. 2 is a diagrammatic plan view of a portion of a support showing the layers of different ingredients accumulating thereon.

FIG. 3 is a fragmentary plan view of the baked product as it emerges from the baking oven; and FIG. 4 is a view similar to FIG. 3, showing a modified form of baked product.

Band ovens are well known in the art; and the present invention may be carried out by hand or by different forms of apparatus for accumulating the ingredients on a baking support. Therefore, the drawings are diagrammatic and intended only as an aid in describing and understanding the invention.

In the illustration in FIG. 1, there is indicated a casing 1 housing a baking chamber 2 though which a continuously moving steel band 3 travels at a given speed to carry the mass to be baked from one end of the oven chamber to the other during the baking process. The band 3 is an endless band and is carried by rollers 4 and 5, one of which is driven by power means (not shown) to effect a continuous movement of the band 3 at a given predetermined speed.

As shown in FIG. 1 the roller 4 is located well in advance of the baking chamber 2, whereby the band 3 during the initial part of its upper run presents a supporting surface extending for a substantial distance ouside of the baking chamber 2, thus providing an apron 6. Located above the apron 6 are two tanks 7 and 8, adapted to hold liquid shortening (such as heated lard) and water, respectively, and a flour bin 9. The tanks 7 and 8, and the bin 9, comprise what will be referred to hereinafter as a battery of ingredient supply containers. Immediately in advance of the baking chamber there is shown a container 10 adapted to hold an edible coating such as ground nuts, ground dried fruits, dry confection, or the like.

A feed line 11 leads from the container 7 to a metering device or gear pump 12, thence to an atomizer 13, which is set at such height and angular relation to the apron 6 as to uniformly deposit thereon a finely divided spray of shortening droplets. The atomizer 13 per se forms no part of the present invention and may be one of conventional form to give the desired atomization or droplet size, and it may be adjustable or replaceable by another atomizer to give a finer or coarser droplet, as the case may be. The contents of the container 7 are continuously agitated by a power driven paddle 7a to keep the ingredients therein blended.

In like manner a feed line 15 leads from the container 8 to a metering device or gear pump 16, thence to an atomizer 17. Here again, the atomizer 17 is set at such height and angular relation to the apron 6 as to uniformly deposit thereon a finely divided spray of water, and it may be one of conventional form, and adjustable or replaceable to change the fineness of the spray. The contents of the container 8 are continuously agitated by a power driven paddle 8a to keep the ingredients therein blended.

The bin 9 for holding flour and other dry ingredients has a sifter screen 19 associated with the discharge opening at the bottom of the container. The ingredients in the bin 9 are constantly fed to the sifter screen 19 by a conventional gravimetric belt feeder or other suitable device (not shown), and the sifter screen 19 is reciprocated by means of a crank arm 20 actuated by an electric motor 21. The quantity of flour deposited is controlled by the feeder and the depositing of flour can be carried out with or without the use of stream splitters or spreaders, depending upon the requirements in accumulating the mass.

As already stated the band 3 is moved continuously and as it passes below the battery of containers 7, 8 and 9 it is lightly coated with a film of liquid shortening sprayed from the atomizer 13. The film of shortening is indicated by the area A in FIG. 2. As the band 3 continues its movement toward the baking chamber 2, the area which has been coated with the shortening film passes beneath the atomizer 17 and receives a spray of water, the film of shortening and the spray of water being indicated by the area B in FIG. 2. Continued movement of the band 3 toward the baking chamber 2 carries the film of shortening and overlying spray of water beneath the sifter screen 19, from which a dusting of flour is layered upon the shortening and water. The accumulation of shortening, water and flour is indicated by the area C in FIG. 2.

As the accumulation of shortening, water and flour continues to be carried by the band 3 toward the baking chamber 2, it passes beneath the container 10 of dry coating material and a dusting of such material is layered thereon by a sifter screen 22 arranged at the discharge opening of the container 10 and reciprocated by a crank arm 23 driven by an electric motor 24. As in the case of the flour dusting, the material in the container 10 is fed to the sifter screen 22 by a gravimetric belt feeder or other suitable feeding device (not shown) and the amount of coating material deposited is controlled by the feeder. The coated mass is indicated by the area D in FIG. 2.

The deposits of liquid shortening and water and the dusting of flour thereon are in controlled proportions to one another according to formula; and the accumulation of liquid and dry ingredients thus layered by mere deposit composes itself into a cohesive mass 25 by contact, i.e., the flour is hydrated by the water and the degree of hydration is determined in part by the amount of shortening present. This self-composition of the mass 25 continues during the early stages of the baking process under the influence of the heat in the oven chamber, and during the composing of the mass the coating material, when present, is caused to become intimately associated therewith.

The mass 25 is carried through the baking chamber 2 on the band 3 within a given period of time and under predetermined temperature conditions according to product formula. It emerges from the baking chamber 2 in sheet form as indicated in FIG. 3, and while still warm and soft or spongy it is cut to shape, a rectangular shape being indicated by broken lines 26. The cutting (or scoring) may be done prior to the baking of the mass, or during the baking operation, as desired and as practice dictates.

There are several arrangements for depositing the ingredients, any one of which is practicable. For example, a plurality of batteries of ingredient supply containers 7, 8 and 9 can be arranged in series, whereby the mass is accumulated by the deposit of a plurality of layers of liquid and dry ingredients in the desired sequence; or a single battery of containers 7, 8 and 9 may feed a plurality of batteries of atomizers 13 and 17 and sifter screens 19 arranged in series. Also, a single battery of ingredient containers 7, 8 and 9 may be employed with the atomizers 13 and 17 and the sifter screen 19 arranged so that the liquid and dry ingredients are simultaneously deposited at a given point, the speed of the apron 6 being regulated to permit the desired amount of ingredients to be accumulated at that point. The primary requisite is that the arrangement provide for depositing the ingredients on the apron 6 in controlled quantities as the mass is being accumulated.

In practice, a product formula is divided into three principal components: A—shortening and oil solubles, B—water with some or all of the water solubles, and C—dry materials. Component A consists of melted or liquid shortening blended with 0–100% of any oil solubles such as flavoring materials. B consists of the moisture (usually water, or it may be milk or a blend of moist ingredients, etc.) required by the formula in which is dissolved 0–100% of the sugar or sugars, 0–100% of the sodium and/or ammonium bicarbonates, etc. C usually contains all of the flour and 0–100% of the sugar and 0–100% of the sodium bicarbonate blended with it.

A vanilla cookie formula (100 lb. flour basis) will serve as an example of how the invention may be practiced and the layering of ingredients in sequence will be described since it is believed to afford a clear understanding. Using the following formula:

|  | Lbs. |
|---|---|
| Cookie flour | 100 |
| Powdered sugar | 37 |
| Water | 28 |
| Lard (heated-liquid) | 17.5 |
| Salt | 1.25 |
| Ammonium bicarbonate | 1.12 |
| Sodium bicarbonate | .13 |
| Vanilla (to flavor). | |

A=Melted lard with vanilla added.

B=Water with salt and ammonium bicarbonate dissolved in it.

C=Pre-blend of flour, sugar and sodium bicarbonate.

The water component B preferably should be atomized very finely for intimate distribution, but the shortening component A can be veried from very fine to coarse depending upon the product structure desired. Also, depending upon the product structure desired, the amount of shortening in the stated formula can be varied from 10% to 60%, the water from 0–40%, and the sugar from 0–60%, of the weight of the flour. It has been found that the proportion of water to shortening can be varied extensively to give different structural characteristics to the baked product; and that with sufficient shortening present, water can be omitted from the formula and a nicely textured "short" product will be obtained. It has also been found that steam may be used to good advantage as a moistening agent. In this connection it is preferable to use water for the initial spray, but thereafter steam may be used and it will condense to supply just a slight amount of moisture more effectively and accurately than such delicate moisture supply can be obtained by atomization. Also, the hot moisture from the steam has been found to be more quickly absorbed by the flour than is the moisture from a cold spray, thus hastening the "setting" of the mass.

It might be stated at this point that "shortening" as used herein, is not limited to melted lard or edible vegetable oils but includes such oils as corn oil, safflower oil, soybean oil, etc. which contain unsaturated fatty acids and are liquid at room temperature.

In the accumulation of the mass for producing a baked product according to the stated formula, in order to obtain the most efficient moisture absorption each layering of liquid and dry ingredients should be deposited in the amount of approximately 2 oz. per square foot of baking support surface. The total accumulated mass can range from 4 to 20 oz. per square foot, but an accumulation in the range of 9 to 10 oz. per square foot is preferred:

The layering of ingredients which has been found to produce an excellent baked product using the stated formula is as follows (using the component identifications A, B and C and percentages of the total amount of each present in the formula):

|  | A, percent | B, percent | C, percent |
|---|---|---|---|
| 1st layering | 4 | 20 | 25 |
| 2nd layering | 24 | 20 | 25 |
| 3rd layering | 24 | 20 | 25 |
| 4th layering | 24 | 20 | 25 |
| 5th layering | 24 | 20 | |

Stated differently, if the 100 lbs. of flour formula involves a total of 185 lbs. of all ingredients, and the layering is to accumulate a total mass of 10 oz. per square foot, then the formula requires 296 square feet of baking support surface. Thus the percentages of the components A, B and C for each square foot of each layering are the specified percentages of 1/296 parts by weight of each of A, B and C.

The accumulated mass according to the foregoing formula is baked until golden brown (9 minutes at 400° F.). It should be noted that it is preferable to end the accumulation of the mass with a deposit of one of the moist ingredients. In doing so the possibility of an unattractive "floury" appearance is obviated.

More examples might be set forth, but it is thought that no real purpose would be served. It must be borne in mind that the average baker will realize that even with the example given, merely by changing the relative proportions of ingredients through the range of variations noted, the resulting baked products will differ so in structure, texture, and quality that they would be considered as falling in several different categories according to their crispness, shortness, sponginess, open texture, heavy texture, etc., etc. Formulas for other products or varieties could be recited, but in each case they also could be varied to obtain a product having particular characteristics. The different formulas and variations thereof do not in any way involve a deviation from the basic concept of the present invention that the ingredients for an edible baked food product can be prepared by mere accumulation in the absence of mixing or other agitation.

Up to this point the disclosure has concerned itself with the means and method of carrying out the basic concept of the present invention, and now attention will be directed to some other features. It will be remembered that heretofore the art concentrated on mixing ingredients to develop the gluten of the flour. Since one of the reasons for the development of the gluten was that it was considered necessary for the handling of the dough, those products only which were made from wheat or rye flours, or contained a percentage thereof, could be made. According to the present invention, the gluten of wheat and rye flours can be and is produced (but not developed as by mixing) to a limited extent, and in some cases it is desirable. However, gluten production is not essential to the present invention, with the result that edible baked products can be made from any of the great number of non-gluten forming flours, such as rice, oat, corn, potato, bean, banana, peanut, cassava and other flours, which heretofore have not been usable by the baker except when mixed with wheat or rye flour, or with a binder such as gelatine, carboxymethyl-cellulose, etc. These non-gluten-forming flours act like wheat and rye flours when accumulated into a mass along with moist ingredients in that they either become hydrated or otherwise compose themselves into a mass which remains united after being baked; and if the desired baked products structure requires added strength (such as is usually supplied by gluten) without having a wheat or rye flavor imparted to it, such strength can be obtained by including any of the well-known neutral bonding agents or binders such as those just mentioned. Thus, the present invention greatly increases the varieties of products which the baker can produce.

Up to this time the disclosure has dealt with liquid shortening primarily to avoid confusion, but the present invention is not limited in this respect because it deals with the preparation of a mass which is to be subjected to a relatively high baking temperature. It has been found that shortening in like proportions to the liquid shortening, can be added to the mass by deposit in the form of chilled beads, flakes or thin extruded ribbons. For some products this is desirable because it provides for a more intimate absorption of the water component by the dry ingredients but at the same time a better controlled localization of the shortening, which controls the spread of gluten lacing (when present) and the inter-relation of ingredients, and, hence, the product structure and texture.

Many ready to eat cereals, and cereals which require some home cooking with moisture added, are usually prepared by mixing flour with a liquid and pre-cooking it to form a pasty mass and break down the flour elements. They are then dried by heating and further treated according to whether the end product is to be granular, flaked, puffed, etc. Basically it is a method involving batch mixing and processing. According to the present invention, such cereal pastes can be made by mere accumulation of the ingredients and heating, not to bake but to break down the starch and other elements and dry the paste to whatever extent necessary according to the end product desired. Here again, the present invention eliminates the mixing equipment and its objectionable features and thus, which is an important feature, obviates batch preparation. The accumulated and prepared mass can be flaked, extruded, puffed, granulated or otherwise treated to provide the desired product, and its cost will be considerably less because of the elimination of batch mixing and cooking.

There are other products too, which fall in different categories, to which the present invention lends itself. For example, added flavoring "bakes out" of most baked goods and for that reason it is difficult, and sometimes impossible, to obtain the desired flavor. With the present invention, added flavor is "baked in" because it can be deposited in the middle of the mass and retained during the baking operation. If anything, it permeates the mass but does not escape because of the fact that the center of the mass is the last and least effected by the baking heat. On the other hand, a plurality of flavorings can be layered in the mass, and in the baked product provide a flavor blend not obtainable in a mixed dough or batter. The result is that lesser amounts of better added flavorings may be used at a very considerable saving, and more appetizing products are obtainable.

A novel feature of the present invention is that it lends itself to the production of "tailored" products heretofore impossible to produce, or at least impossible to produce by commercial baking practices. For example: formulas can be combined, i.e., in accumulating the mass one or more layerings may be of one formula, then one or more layerings may be of a different formula, and so on. Coloring may be confined to the outside with the center white, for example; or coloring may be interspersed in the layerings at will; or multiple colorings may be used uniformly, haphazardly, or to produce a definite design. Fillers may be introduced, either layered or scattered at random. In short, a finished baked product can be produced from whatever ingredients may be accumulated on the baking surface in accordance with the dictates of the baker's creative talent.

Heretofore it has been the practice to make filled or sandwiched products of two outer coverings and a filler, usually first making the baked coverings and then, as a separate operation, sandwiching the filler between them. This is obviated by the present invention, whereby the filler can be layered in the accumulating of the mass, either as a single central layer or as a plurality of layers dispersed throughout the mass. It should be mentioned too, that while the container 10 shown in FIG. 1 was referred to as a container for a coating material, such containers may form a part of the batteries of ingredient containers and their contents may be deposited throughout the accumulating mass rather than merely as a final coating.

It has been found that the accumulated mass of the present invention may be readily refrigerated in an unbaked condition, thus rendering it capable of being made available for home baking. To this end, the mass is accumulated in the usual manner and, depending upon its formula, it may then be in condition to be cut to size and shape, refrigerated, packaged and stored for subsequent delivery to retail outlets; or it may require partial refrigeration to "set" the mass and condition it for cutting, and thereafter be further refrigerated to the desired degree for packaging and storage.

By way of summary, but not limitation, the present invention gives rise to the following advantages:

It eliminates conventional dough mixers.

It eliminates other heavy equipment such as dough brakes or sheeters, cutters and other dough manipulating, forming and cutting equipment.

It provides for a rapid change-over from one variety of product to another, simply by varying the proportions of ingredients, omitting or adding one or more ingredients, etc.

It provides for the continuous preparation of "hard to mix" formulas for which up until now there has been no practical method of "continuous" mixing.

It provides great economy and flexibility in production operations.

It makes possible the production of "tailored" products which cannot be obtained by known techniques.

It provides for improved flavoring.

Production can be commenced or stopped at will, and is not dependent upon using up an entire batch of prepared dough. This is important in the event of emergency due to mechanical failure or other difficulty at any point in the manufacturing operation from the beginning of the accumulation of the mass to the end of the packaging operation.

Unusual and unique varieties of products can be produced which heretofore could not be made.

It provides for a more efficient utilization of shortening to produce products of better eating characteristics than were heretofore available.

It provides for better texture and eatability of product because of the elimination of mixing and kneading and thereby avoiding a gluten network development.

It provides for making products from materials not heretofore usable because of the absence of gluten.

Many other advantages will be apparent to those familiar with the art and because they have not all been set forth herein the failure to specify each and every one of them is not to be construed as lessening the scope of the invention. As already stated, the present invention is revolutionary in its concept and it is not to be limited in any respect except insofar as limitations are set forth in the appended claims.

Having thus described my invention, what I claim is:

1. In the production of an edible food product utilizing dough ingredients wherein the solid and liquid constituents of said dough ingredients are normally worked into a dough mass, the improvement of assembling said dough ingredients in condition for baking without physical working thereof, said improvement comprising distributing the solid constituents of said dough ingredients in the dry state on a baking surface in loose, finely divided condition until an uncompacted layer of suitable thickness is obtained, incorporating in said layer the liquid constituents while maintaining said layer in a generally quiescent state, and baking said layer without disturbance to the general disposition of the ingredients therein.

2. In the production of an edible food product utilizing solid and liquid dough ingredients wherein the dough ingredients are normally worked into a dough mass, the improvement of assembling said dough ingredients in condition for baking without physical working thereof, said improvement comprising the successive steps of distributing the solid dough ingredients in a dry state on a baking surface in loose, finely divided condition until an uncompacted layer of suitable thickness is obtained, contacting said layer with the liquid ingredients while maintaining said layer in a generally quiescent state, and baking said liquid treated layer without disturbance to the general disposition of the ingredients therein.

3. A process according to claim 1, wherein the incorporation of said liquid constituents takes place after said solid constituents have been distributed.

4. A process according to claim 1, wherein the incorporation of said liquid constituents occurs after a portion of said solid constituents have been distributed, but before the complete distribution of said solid constituents.

5. A process according to claim 1, wherein the dough ingredients are distributed in sequential order to form layers of said solid constituents, and said liquid constituents are incorporated thereover.

6. A process according to claim 1, wherein the distribution of said dough ingredients occurs simultaneously.

7. A process according to claim 1 wherein the solid ingredients comprise flour and the liquid ingredients comprise water and shortening.

8. In the production of an edible food product utilizing dough ingredients wherein the solid and liquid constituents of said dough ingredients are worked into a dough mass, the improvement of assembling said dough ingredients in condition for baking without physical working thereof, asid improvement comprising distributing the solid constituents of said dough ingredients in the dry state on a baking surface in loose, finely divided condition until an uncompacted layer of suitable thickness is obtained, incorporating in said layer the liquid constituents while maintaining said layer in a generally quiescent state, and baking said layer without disturbance to the general disposition of the ingredients therein to compose said layer into unitary mass.

9. In the production of an edible food product utilizing dough ingredients wherein the solid and liquid constituents of said dough ingredients are worked into a dough mass, the improvement of assembling said dough ingredients in condition for baking without physical working thereof, said improvement comprising distributing the solid constituents of said dough ingredients in the dry state on a baking surface in loose, finely divided condition until an uncompacted layer of suitable thickness is obtained, incorporating in said layer the liquid constituents while maintaining said layer in a generally quiescent state, refrigerating said layer to render it adaptable for storage, and then baking said layer without disturbance to the general disposition of the ingredients.

References Cited in the file of this patent

UNITED STATES PATENTS

| | | |
|---|---|---|
| 332,018 | Smith | Dec. 8, 1885 |
| 852,497 | Chambers | May 7, 1907 |
| 1,035,836 | Anderson | Aug. 20, 1912 |
| 1,790,347 | Hawkins | Jan. 27, 1931 |
| 2,703,059 | Kaser | Mar. 1, 1955 |
| 2,798,813 | Patterson | July 9, 1957 |
| 2,836,498 | Fennema | May 27, 1958 |